United States Patent [19]
Johnson

[11] Patent Number: 6,145,385
[45] Date of Patent: Nov. 14, 2000

[54] MEASUREMENT OF MECHANICAL FASTENER CLAMPING FORCE

[75] Inventor: Michael G. Johnson, Sparta, N.J.

[73] Assignee: Lucent Technologies Inc., Murray Hill, N.J.

[21] Appl. No.: 09/221,726

[22] Filed: Dec. 29, 1998

[51] Int. Cl.[7] ..................................................... G01N 3/02
[52] U.S. Cl. .............................................. 73/856; 73/819
[58] Field of Search .......................... 73/760, 761, 774, 73/788, 856, 862.03, 862.381, 819

[56] References Cited

U.S. PATENT DOCUMENTS

| | | | |
|---|---|---|---|
| 4,491,760 | 1/1985 | Linvill | 310/334 |
| 4,561,314 | 12/1985 | Alley et al. | 73/862.69 |
| 5,515,725 | 5/1996 | Tabota et al. | 73/514.34 |

*Primary Examiner*—Max Noori
*Attorney, Agent, or Firm*—David L. Davis

[57] ABSTRACT

A construction and a method for measuring the clamping force exerted by a fastener securing together two bodies. The construction includes a piece of material the same as that of a first of the bodies and a stack of at least two pieces of the same material as the second body. The overall height of the stack is equal to the thickness of the second body. A fastener secures all the pieces together. By measuring the force required to move a piece of the stack relative to the other pieces of the stack, an indication of the force exerted by the fastener is provided.

12 Claims, 1 Drawing Sheet

MEASUREMENT OF MECHANICAL FASTENER CLAMPING FORCE

BACKGROUND OF THE INVENTION

This invention relates to a fastener for securing together two bodies and, more particularly, to the measurement of the normal clamping force exerted by such a fastener.

Printed circuit boards containing power amplifiers are often mounted on a metal board (called a "pallet") for heat sinking and grounding purposes. The pallet is also used to keep the printed circuit board flat during the manufacturing process. The Applicants's U.S. patent application Ser. No. 09/107,846, filed Jun. 30, 1998, for "Recessed Mechanical Fasteners for Circuit Boards", discloses the mounting of the printed circuit board to the pallet by means of fasteners, such as rivets, eyelets or screws, which pass through the printed circuit board and the pallet to clamp them together. It would be desirable to be able to compare the clamping force of the various types of fasteners, and to monitor variations in this force over time, temperature and thermal cycling.

SUMMARY OF THE INVENTION

According to the present invention, the normal clamping force exerted by a fastener securing a first body of a first material to a second body of a second material, wherein the fastener extends along an axis through aligned openings in the first and second bodies, is measured by providing a first sample piece of the first material and a stack of at least two sample pieces of the second material. The thickness of the first sample piece is equal to the thickness of the first body and the overall height of the stack is equal to the thickness of the second body. Each of the sample pieces has an opening therethrough of a size sufficient to receive a fastener, with the size of the opening of one piece of the stack being enlarged relative to the size of the opening of the other pieces of the stack. There is further provided a fastener extending through the openings of the sample pieces to clamp the first sample piece to the stack. The force required to move one piece of the stack relative to the other pieces of the stack and to the first sample piece is measured to indirectly provide a measure of the clamping force exerted by the fastener.

In accordance with an aspect of this invention, the stack comprises three sample pieces of the second material, and the force required to move the central piece of the stack relative to the two outer pieces of the stack is measured.

In accordance with another aspect of this invention, the opening of the central piece of the stack is elongated so that the movement of the central piece of the stack is translational.

In accordance with a further aspect of this invention, all of the openings are circular and the movement of the central piece of the stack is rotational about the axis of the fastener.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
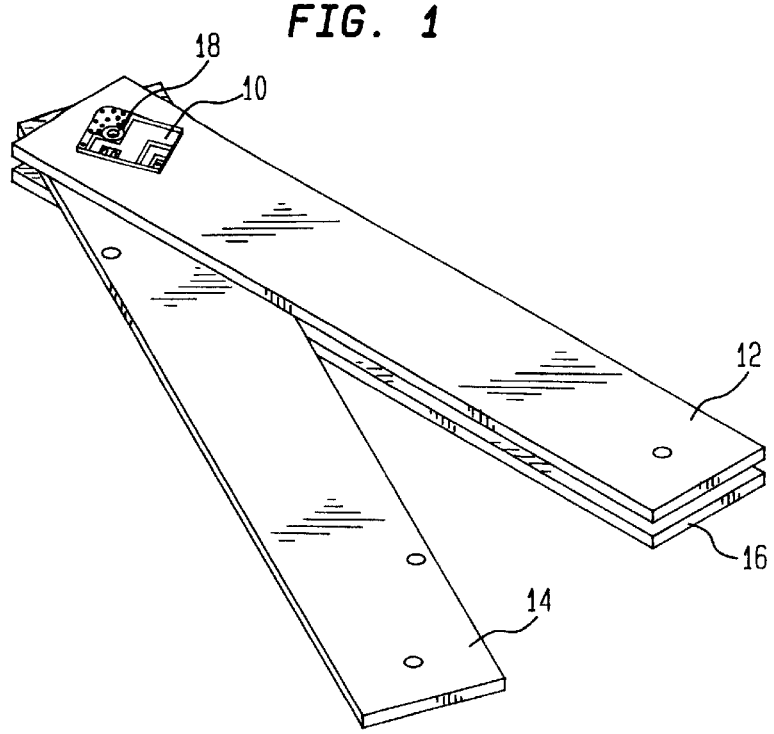
FIG. 1 is a perspective view of an inventive construction for practicing the present invention.

Referring now to the drawings, FIG. 1 shows an inventive construction for practicing the present invention. As shown, the inventive construction includes a small piece 10 of printed circuit board material and a stack including three pieces 12, 14, 16 of the material used for the pallet. The thickness of the piece 10 is equal to the thickness of the printed circuit board and the overall height of the stack (i.e., the cumulative thicknesses of the pieces 12, 14, 16) is equal to the thickness of the pallet. The four pieces 10, 12, 16, 14 are secured together by the fastener 18 which passes through holes formed in each of the pieces 10, 12, 14, 16.

Figure 2:
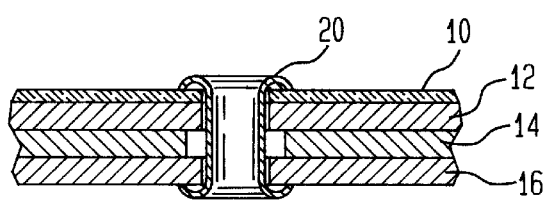
FIGS. 2–5 are side views of the construction shown in FIG. 1, each illustrating a different type of fastener.
Figure 3:
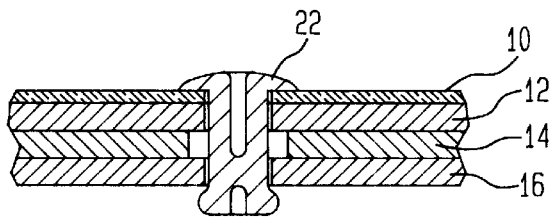
Figure 4:
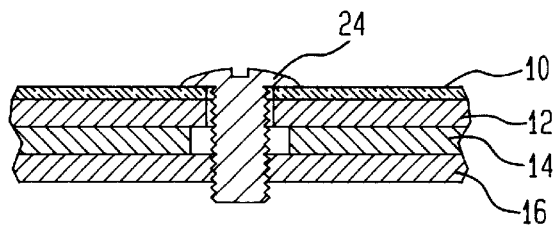
Figure 5:
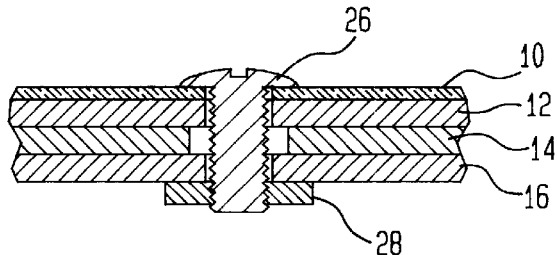

FIG. 2 illustrates an inventive construction where the fastener is an eyelet 20. FIG. 3 illustrates an inventive construction where the fastener is a pop rivet 22. FIG. 4 illustrates an inventive construction where the fastener is a threaded screw 24, with the opening of the lower stacked piece 16 being internally threaded to receive the screw 24. FIG. 5 illustrates an inventive construction where the fastener includes a screw 26 and a nut 28.

In use, the construction shown in FIG. 1 is assembled and held together by the fastener 18, which in the case of the screws 24, 26 is torqued to specification. The center stack piece 14 is rotated relative to the pieces 12, 16 about the axis of the fastener 18. The torque to overcome friction to move the piece 14 is proportional to the clamping force exerted by the fastener 18. This torque can be accurately measured using a force gauge placed at a known distance from the fastener 18. The assembly can then be baked, vibrated, thermal cycled, etc., to simulate the worst case operating environment of a final assembly, after which the torque can again be measured to monitor any degradation in the clamping force of the fastener 18.

The foregoing description of the operation of the inventive construction is for the case where the holes through the pieces 10, 12, 14, 16 are circular for accepting the fastener 18 therethrough. In this case, the hole of the central stack piece 14 is larger than the other holes to form a loose fit with the fastener 18, as clearly shown in FIGS. 2–5. Rotation of the central stack piece 14 and measuring the torque provides a measure of the friction torque exerted by the fastener 18. If it is desired to measure the friction force exerted by the fastener 18, the hole in the central stack piece 14 is elongated to form a slot. In this case, instead of being rotated, the central stack piece 14 is translated relative to the rest of the assembly and the friction force is measured with a force gauge.

Figure 6:
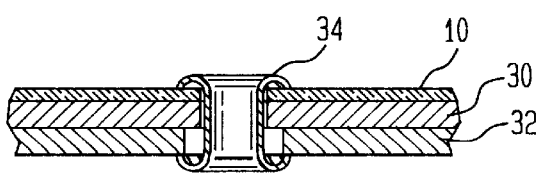
FIG. 6 illustrates an alternate embodiment of an inventive construction wherein the stack has two pieces, rather than the three shown in FIGS. 1–5.

FIG. 6 illustrates an inventive construction wherein the stack of pieces of the material used for the pallet consists of two pieces 30, 32, and the fastener is an eyelet 34. In this construction, the piece 32 has an enlarged opening relative to the pieces 10, 30 and is the piece that is moved to measure the clamping force exerted by the fastener 34. When the piece 32 is moved, care must be taken to prevent the pieces 10, 30 from moving.

Accordingly, there has been disclosed an improved construction and method for measuring the clamping force exerted by a fastener. While illustrative embodiments of the present invention have been disclosed herein, it is understood that various modifications and adaptations to the disclosed embodiments are possible and it is intended that this invention be limited only by the scope of the appended claims.

What is claimed is:

1. A construction for measuring the normal clamping force exerted by a fastener securing a first body of a first material to a second body of a second material, wherein the fastener extends along an axis through aligned openings in the first and second bodies, the construction comprising:

a first sample piece of said first material having an opening therethrough of a size sufficient to receive a fastener, the dimension of said first sample piece through said opening being equal to the dimension of said first body along said axis;

a stack of at least two sample pieces of said second material, wherein the height of said stack is equal to the dimension of said second body along said axis, wherein each of the at least two sample pieces has a respective opening therethrough, and wherein the openings of the pieces of the stack are of a size sufficient to receive a fastener with the opening of one piece of the stack being enlarged relative to the size of the openings of the other pieces of the stack;

a fastener extending through the openings of the first sample piece and the stack to clamp the first sample piece to the stack; and a sensor for measuring the force required to move the one piece of the stack relative to the other pieces of the stack and to the first sample piece.

2. The construction according to claim 1 wherein:

the stack comprises three sample pieces of said second material and said one piece consists of the central piece of the stack; and the sensor measures the force required to move the central piece of the stack relative to the two outer pieces of the stack.

3. The construction according to claim 2 wherein the opening of the central piece of the stack is elongated so that the movement of the central piece of the stack is translational.

4. The construction according to claim 2 wherein all the openings are circular so that the movement of the central piece of the stack is rotational about the fastener axis.

5. The construction according to claim 2 wherein the fastener comprises a headed screw and the opening of the outer piece of the stack remote from the first sample piece is internally threaded to receive the screw, and wherein the head of the screw bears against the first sample piece.

6. The construction according to claim 1 wherein the fastener comprises a headed bolt and a nut.

7. The construction according to claim 1 wherein the fastener comprises a pop rivet.

8. The construction according to claim 1 wherein the fastener comprises an eyelet swaged against the first sample piece and the piece of the stack remote from the first sample piece.

9. A method for measuring the normal clamping force exerted by a fastener securing a first body of a first material to a second body of a second material, wherein the fastener extends along an axis through aligned openings in the first and second bodies, the method comprising the steps of:

providing a first sample piece of said first material having an opening therethrough of a size sufficient to receive a fastener, the dimension of said first sample piece through said opening being equal to the dimension of said first body along said axis;

providing a stack of at least two sample pieces of said second material, wherein the height of said stack is equal to the dimension of said second body along said axis, wherein each of the at least two sample pieces has a respective opening therethrough, and wherein the openings of the pieces of the stack are of a size sufficient to receive a fastener with the opening of one piece of the stack being enlarged relative to the size of the openings of the other pieces of the stack;

providing a fastener extending through the openings of the first sample piece and the stack to clamp the first sample piece to the stack; and measuring the force required to move the one piece of the stack relative to the other pieces of the stack and to the first sample piece.

10. The method according to claim 9 wherein:

the step of providing a stack includes the step of providing a stack of three sample pieces of said second material; and the step of measuring includes the step of measuring the force required to move the central piece of the stack relative to the two outer pieces of the stack.

11. The method according to claim 10 wherein the opening of the central piece of the stack is elongated and the step of measuring includes the step of moving the central piece of the stack translationally.

12. The method according to claim 10 wherein all the openings are circular and the step of measuring includes the step of moving the central piece of the stack rotationally about the fastener axis.

\* \* \* \* \*